US007522755B2

(12) United States Patent
Li et al.

(10) Patent No.: US 7,522,755 B2
(45) Date of Patent: Apr. 21, 2009

(54) SYSTEMS, METHODS AND APPARATUS FOR FILTERED BACK-PROJECTION RECONSTRUCTION IN DIGITAL TOMOSYNTHESIS (75) Inventors: Baojun Li, Waukesha, WI (US); Gopal B. Avinash, New Berlin, WI (US); Renuka Uppaluri, Pewaukee, WI (US)

(73) Assignee: General Electric Company, Schenectady, NY (US)

( * ) Notice: Subject to any disclaimer, the term of this patent is extended or adjusted under 35 U.S.C. 154(b) by 844 days.

(21) Appl. No.: 11/069,308

(22) Filed: Mar. 1, 2005

(65) Prior Publication Data
US 2006/0204076 A1 Sep. 14, 2006

(51) Int. Cl.
*G06K 9/00* (2006.01)
(52) U.S. Cl. .............................. 382/128; 128/922; 378/4
(58) Field of Classification Search ................. 382/100, 382/128, 130, 131, 132, 154, 260–265; 128/922; 378/4–27; 375/240.09, 350; 359/308, 337.2
See application file for complete search history.

(56) References Cited

U.S. PATENT DOCUMENTS

| | | | | |
|---|---|---|---|---|
| 5,293,312 A | * | 3/1994 | Waggener | 378/14 |
| 6,549,607 B1 | * | 4/2003 | Webber | 378/8 |
| 6,633,657 B1 | * | 10/2003 | Kump et al. | 382/128 |
| 6,707,878 B2 | * | 3/2004 | Claus et al. | 378/22 |
| 6,801,597 B2 | * | 10/2004 | Webber | 378/62 |
| 7,310,436 B2 | * | 12/2007 | Li et al. | 382/131 |
| 2003/0194049 A1 | * | 10/2003 | Claus et al. | 378/22 |
| 2005/0002550 A1 | * | 1/2005 | Jabri et al. | 382/131 |

* cited by examiner

*Primary Examiner*—Anand Bhatnagar
(74) *Attorney, Agent, or Firm*—Peter Vogel, Esq.; William Baxter, Esq.; Michael G. Smith, Esq.

(57) ABSTRACT

Systems, methods and apparatus are provided through which a specialized back-projection process reconstructs a finely detailed and crisp three-dimensional image (3-D) from a series of two-dimensional (2-D) images by pre-filtering the 2-D images with a first group of settings before back-projecting the 2-D images into a 3-D image, and then post-filtering the 3-D image with another group of settings. In some embodiments, the first group of settings and the second group of settings are synergistically optimized in relation to each other to provide emphasis on a structure of interest in the object.

24 Claims, 9 Drawing Sheets

SYSTEMS, METHODS AND APPARATUS FOR FILTERED BACK-PROJECTION RECONSTRUCTION IN DIGITAL TOMOSYNTHESIS

RELATED APPLICATION

This invention relates generally to medical imaging, and more particularly to configuration of medical image processing.

BACKGROUND OF THE INVENTION

Electromagnetic imaging is typically used to inquire into the condition of a particular structure of interest in an object. Structures of interest in a human subject include a particular organ such as the heart, and a particular bone such as the tibia.

Digital tomosynthesis imaging further provides a three dimensional (3-D) image of an object that is reconstructed from a set of two-dimensional (2-D) projection radiograph images. A digital tomosynthesis system includes an X-Ray source and a 2-D X-Ray detector, which is a digital detector. In conventional digital tomosynthesis systems, during data acquisition the X-Ray source is rotated by a gantry on an arc through a limited angular range about a pivot point and a set of projection radiographs of the object are acquired by the detector at discrete locations of the X-Ray source. The detector is maintained at a stationary position as the radiographs are acquired. Imaging of the object from different orientations allows depth information to be incorporated into a final image. This depth information is, of course, unavailable in non-tomosynthesis imaging.

Once the projection radiographs have been obtained, they are then spatially translated with respect to each other and superimposed in such a manner that the images of structures in the tomosynthesis plane overlap exactly. The images of structures outside the tomosynthesis plane do not overlap exactly, resulting in a depth dependent blurring of these structures. By varying the amount of relative translation of the projection radiographs, the location of the tomosynthesis plane can be varied within the object. Each time the tomosynthesis plane is varied, the image data corresponding to the overlapping structures is superimposed and a 2-D image of the structure in the tomosynthesis plane is obtained. Once a complete set of 2-D images of the object has been obtained, a 3-D image of the object is reconstructed from the set of 2-D images.

Computed tomography (CT) is a technique that generally involves subjecting a patient to X-Rays, acquiring digital X-Ray data of a portion of the patient's body, and processing and back-projecting the digital X-Ray data to reconstruct a 3-D image of the object. The image may then be displayed on a display monitor of the CT system.

CT systems typically comprise a gantry, a table, an X-Ray tube, an X-Ray detector array, a computer and a display monitor. The computer sends commands to controllers of the gantry to cause the controllers to rotate the X-Ray tube and/or the detector array at a particular rotational speed to produce relative rotation between the X-Ray tube and the detector array 360° about the patient. The detector array is usually comprised of either a curved array (third generation CT system) of detector elements or a ring (fourth generation CT system) of detector elements. In the case where a ring of detector elements is used, only the X-Ray tube is rotated.

Conventional reconstruction method focus mainly on suppressing the underlying/overlying structures of interest, seldom taking into account the unique characteristics of tomosynthesis projections, especially the spectrum, and optimizing the method to enhance the structures of interest. Early trials on filtered back-projection geometrically transformed the tomosynthesis projections to a form suitable for CT or volumetric computed tomography (VCT) reconstruction. But these methods are known to produce "streaking artifacts."

Conventional filtered back-projection methods enhance the contrast of structures of interest of certain sizes. Unfortunately, conventional filtered back-projection methods suffer from artifacts generated in the 3-D image that are caused by aliasing and that are also caused by the complexity of optimizing the method for all structures of interest that are present in general X-ray radiography images.

In X-ray radiology, radiologists expect to see medical images that have crisp distinctions. However conventional filtered back-projection methods tend to smooth the image, thus losing many of the finer details in the image.

For the reasons stated above, and for other reasons stated below which will become apparent to those skilled in the art upon reading and understanding the present specification, there is a need in the art to generate a 3-D image from 2-D images of a subject that yield images that have sharp visual distinctions and that also have the details of the 2-D images.

BRIEF DESCRIPTION OF THE INVENTION

The above-mentioned shortcomings, disadvantages and problems are addressed herein, which will be understood by reading and studying the following specification.

In one aspect, a method to construct a three-dimensional (3-D) image of an object from a plurality of two-dimensional (2-D) projection images of the object includes performing some filtration of image data before back-projection, and other filtration after back-projection. This aspect provides a 3-D image that has sharp visual distinctions and that also have the details of the 2-D images.

More specifically, the method includes pre-filtering the plurality of 2-D projection images, back-projecting the filtered 2-D projection images into the 3-D image, and post-filtering the 3-D image. The pre-filtering is performed in reference to a first group of settings that are optimized to provide a first extent of emphasis on at least one structure of interest in the object and the post-filtering is performed in reference to a second group of settings that are optimized to provide a second extent of emphasis on the at least one structure of interest in the object that is synergistic with the first extent of emphasis.

In another aspect, a method to construct a 3-D image of an object from a plurality of 2-D projection images of the object includes controlling pre-filtration of the plurality of 2-D projection images, in reference to configuration settings that are optimized to provide a first extent of emphasis on a plurality of structures of interest in the object; back-projecting the filtered 2-D images into the 3-D image; and then controlling post-filtration of the 3-D image in reference to configuration settings that are optimized to provide a second extent of emphasis on the plurality of structures of interest in the object that is synergistic with the first extent of emphasis.

In yet another aspect, a method to generate a 3-D image of an object includes heuristically adapting at least one configuration setting and reconstructing the 3-D image of an object from a plurality of 2-D projection images of the object and from the at least one configuration setting.

In still another aspect, a method to configure generation of a 3-D image of an object from a plurality of 2-D images, includes receiving from an operator at least one configuration setting for pre-filtering and/or post-filtering of the images and storing the configuration settings in a location that is readily accessible to a generator of the 3-D image.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, methods of embodiments are described. In the third section, the hardware and the operating environment in conjunction with which embodiments may be practiced are described. In the fourth section, particular implementations are described. Finally, in the fifth section, a conclusion of the detailed description is provided.

System Level Overview

Figure 1:
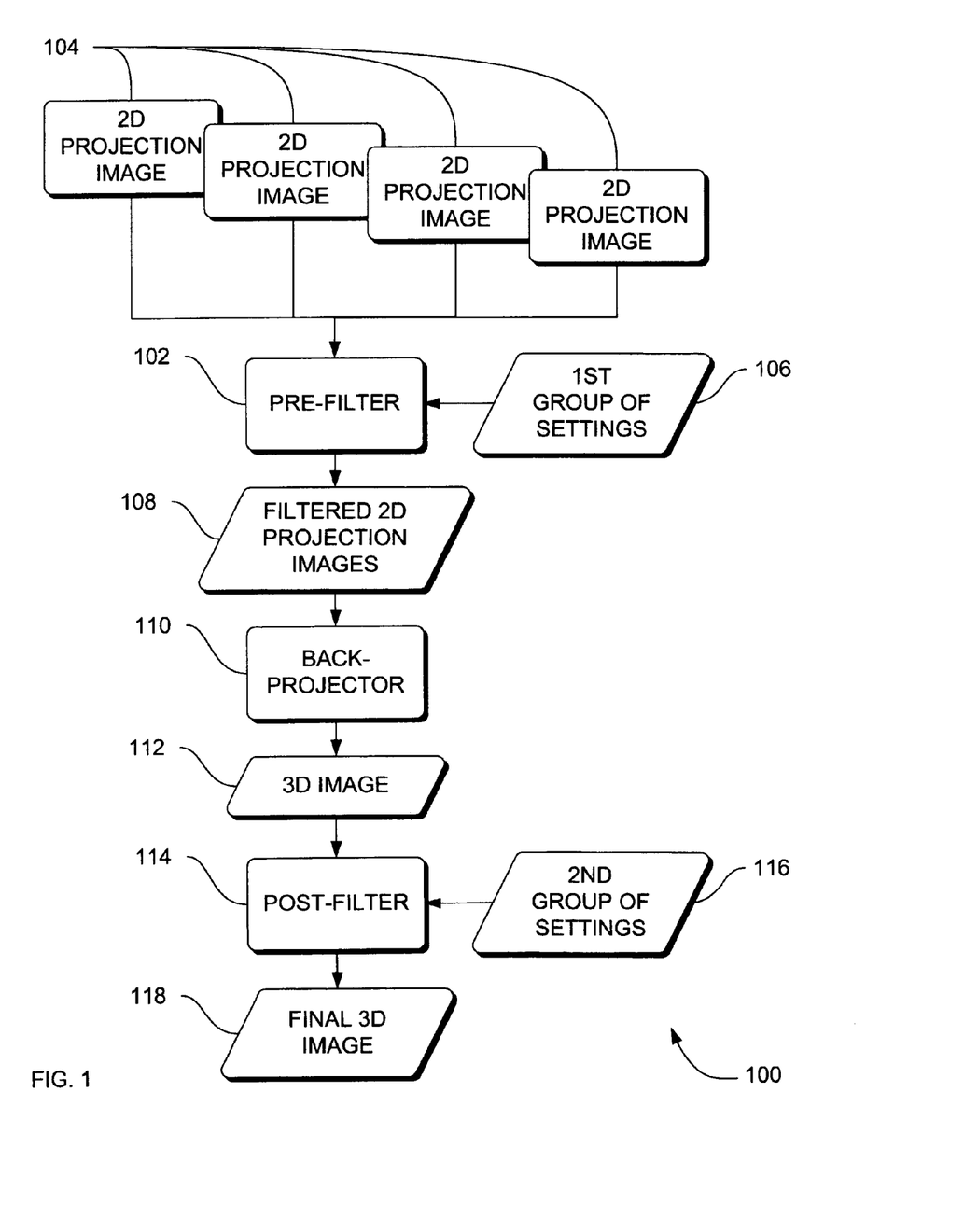
FIG. 1 is a diagram illustrating a system-level overview of an embodiment.

FIG. 1 is a block diagram that provides a system level overview of a system to construct a three-dimensional (3-D) image of an object from a plurality of two-dimensional (2-D) projection images of the object. System 100 solves the need in the art to generate a 3-D image from 2-D images of a subject that have sharp visual distinctions and that also have the details of the 2-D images.

System 100 includes a pre-filter 102 of the plurality of 2-D projection images 104. The pre-filter 102 filters the plurality of 2-D projection images 104 in reference to a first group of settings 106. The first group of settings 106 is optimized to visually emphasize one or more structures of interest in the object. The pre-filter 102 universally enhances the structures in the projection images so that fine details are not lost later in back-projection.

System 100 also includes a back-projector 108 of the filtered 2-D projection images 110 into the three-dimensional image 112. Back-projection has the effect of low-pass filtration in signal processing.

The 3-D image 112 is filtered by a post-filter 114 in reference to a second group of settings 116. The post-filter 114 helps recover some of the edge loss introduced by the back-projector 108. In medical implementations, the post-filter 114 also balances brightness that is tissue-specific of the image in the manner of the original 2-D images.

The second group of settings 116 is optimized to provide a second extent of emphasis on the one or more structures of interest in the object that is synergistic with the first extent of emphasis. One embodiment of the relationship of the first group of settings 106 and the second group of settings is described in FIG. 3 below. The post-filter 114 locally enhances only the structures of interest (or frequencies of interest). The first group of settings 106 and the second group of settings 116 are also known as configuration settings.

The post-filter 114 yields a final 3-D image 118 of the object that has a visual emphasis on the one or more structures of interest in the object that is the result of an optimized synergistic amount of pre-filtering by pre-filter 102 and of post-filtering by post-filter 114.

The combination of the pre-filter 102 before the back-projector 110 that universally enhances the structures in the projection images so that fine details aren't lost later in back-projection, with the post-filter 114 that recovers some of the edge loss introduced by the back-projector 110 provides 3-D images that have sharp visual distinctions and that also have the details of the 2-D images from which the 3-D images are generated.

The system level overview of the operation of an embodiment is described in this section of the detailed description. Some embodiments operate in a multi-processing, multi-threaded operating environment on a computer, such as computer 802 in FIG. 8.

While the system 100 is not limited to any particular pre-filter 102, plurality of 2-D projection images 104, first group of settings 106, back-projector 108, filtered 2-D projection images 110, 3-D image 112, post-filter 114, and second group of settings 116, for sake of clarity a simplified pre-filter 102, plurality of 2-D projection images 104, first group of settings 106, back-projector 108, filtered 2-D projection images 110, 3-D image 112, post-filter 114, and second group of settings 116 are described.

Methods of an Embodiment

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 200-700 are performed by a program executing on, or performed by firmware or hardware that is a part of, a computer, such as computer 802 in FIG. 8.

Figure 2:
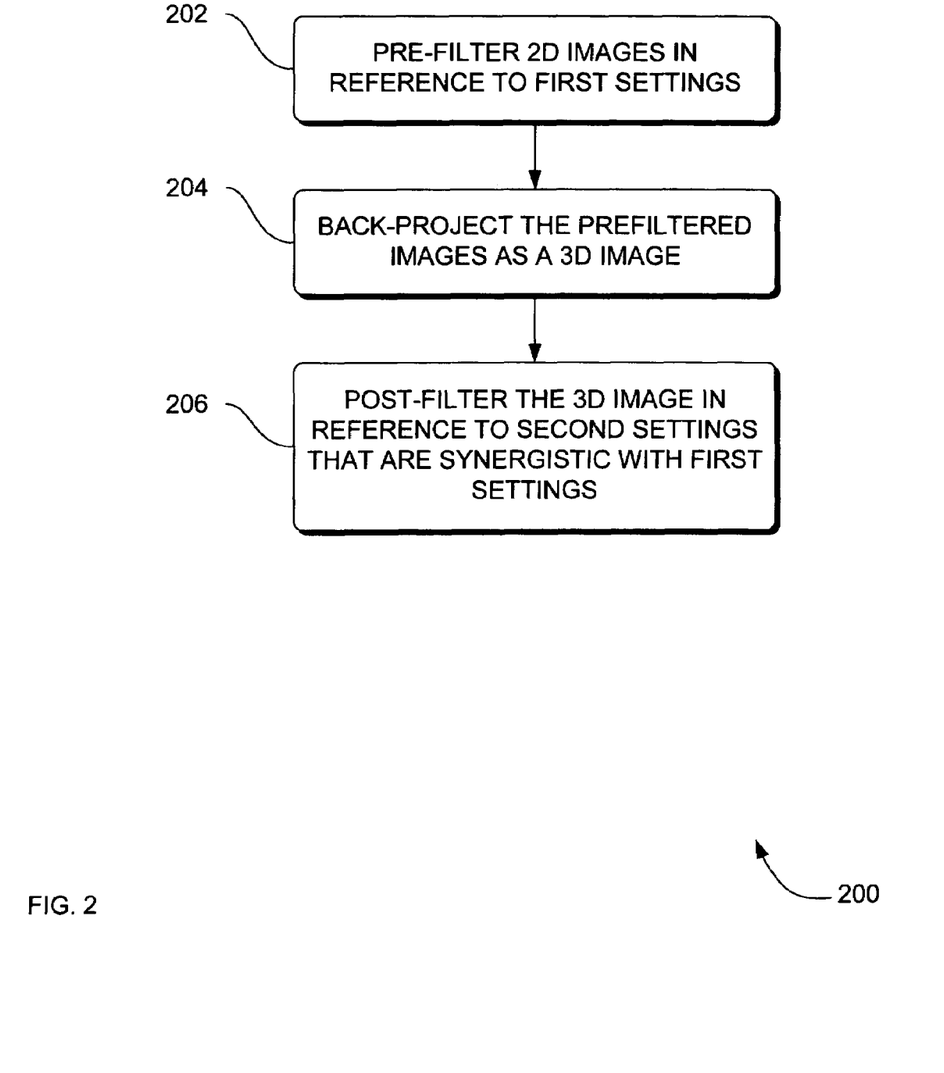
FIG. 2 is a flowchart of a method to construct a three-dimensional (3-D) image of an object from a plurality of two-dimensional (2-D) projection images of the object according to an embodiment.

FIG. 2 is a flowchart of a method 200 to construct a three-dimensional (3-D) image of an object from a plurality of two-dimensional (2-D) projection images of the object according to an embodiment. Method 200 solves the need in the art to generate a 3-D image from 2-D images of a subject that yield images that have sharp visual distinctions and that also have the details of the 2-D images.

Method 200 includes pre-filtering 202 the plurality of 2-D projection images, in reference to a first group of settings that are optimized to provide a first extent of emphasis one of more structures of interest in the object. The pre-filtering 202 can be performed either in one-dimension or two-dimensions. The two-dimensional filter can be generated from the one-dimensional filter by either swirl it 360 degrees ("circular"), or multiplying itself by its transposed version ("rectangular"). An example of the 2-D projection images are the 2-D projection images 104 in FIG. 1. In some embodiments, pre-filtering includes global filtering. In some embodiments the global filtering further includes frequency domain filtering. An example of the first group of settings is the first group of settings 106 in FIG. 1.

Method 200 also includes back-projecting 204 the filtered 2-D projection images into the 3-D image in the form of 2-D slice images. In some embodiments, back-projecting is based on a filtered back-projection principles (e.g. shift & add, generalized filtered back-projection, order statistics back-projection, etc.), based on a back-projecting filtering principle in which back-projecting 204 is performed first and then followed by pre-filtering 202, and/or based on a minimum-norm solution. Examples of minimum-norm solutions include algebraic reconstruction technique (ART), direct algebraic reconstruction technique (DART), matrix inversion tomosynthesis (MITS), tuned aperture computed tomography (TACT), Fourier-Based Reconstruction, objective function-based reconstruction, maximum likelihood (ML), maximum a posterior (MAP) methods. An example of the 3-D image is the 3-D image 112 in FIG. 1.

Thereafter, method 200 includes post-filtering 206 the 3-D image, in reference to a second group of settings that are optimized to provide a second extent of emphasis on the one or more structures of interest in the object. In some embodiments, the post-filtering 206 includes local filtering. In some embodiments the local filtering further includes spatial domain filtering.

The first group of settings, such as 106 in FIG. 1 and the second group of settings, such as 116 in FIG. 1 are designed to have a synergistic between the first extent of emphasis and the second extent of emphasis. Moreover, in some medical embodiments, the first group settings are customized based on anatomy of the subject patient, acquisition protocol (e.g. mAs, kVp, tube angulations), patient size, patient motion, and display processing protocol.

The post-filtering 206 is performed either in one dimension, two dimensions or three dimensions.

Figure 3:
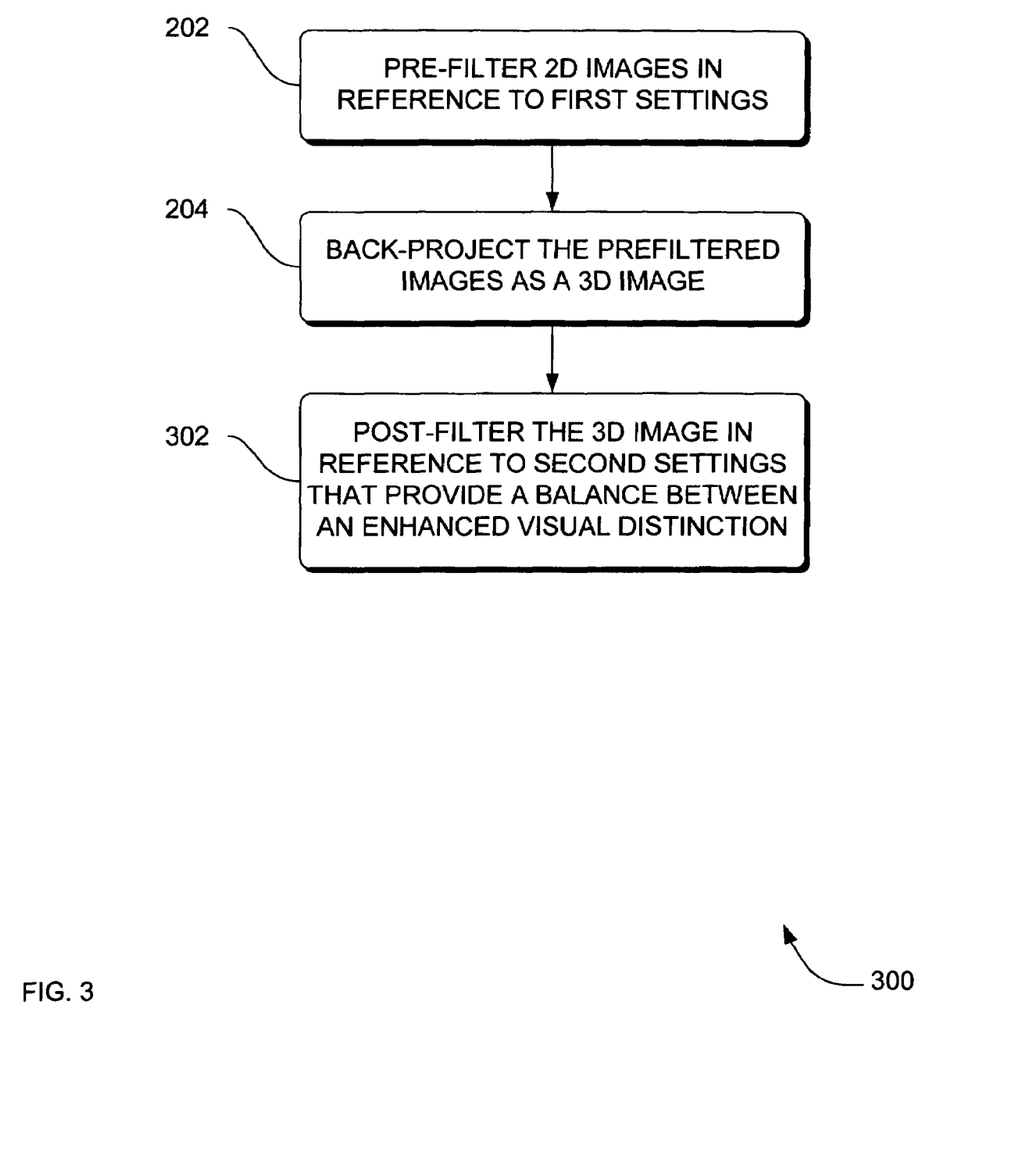
FIG. 3 is a flowchart of a method to construct a 3-D image of an object from a plurality of 2-D projection images of the object according to a particular embodiment of post-filtration.

FIG. 3 is a flowchart of a method 300 to construct a 3-D image of an object from a plurality of two-dimensional 2-D projection images of the object according to a particular embodiment of post-filtration.

Method 300 includes pre-filtering 202 the plurality of 2-D projection images as in method 200 and back-projecting 204 the filtered 2-D projection images into the three-dimensional image also as in method 200.

Thereafter, method 300 includes a specific embodiment of post-filtering 206 the 3-D image. In this embodiment, the 3-D image is post-filtered 302 in reference to a second group of settings that are optimized to provide a balance between an enhanced visual distinction of the one or more structures of interest and an optimal visual representation or depiction of the at least one structure of interest. Optimal visual representation refers to structure emphasis without enhancing artifacts such as overshoots, undershoots and noise. For example, the pre-filter settings can be configured to specify a ram-lak filter function within a range from a low degree of filtering defined by a slope of 0.01 to a high degree of filtering defined by a slope of 0.1. The post-filter can be configured to specify an edge strength within a range from a low extent of edge strengthening of 1 to a high degree of edge strengthening of 10. An example of edge strengthening may use multi-resolution processing wherein certain spatial frequency bands are emphasized while certain other spatial frequency bands are suppressed. This results in an optimal balance between edge enhancement without artifacts such as overshoots, undershoots and noise enhancement.

In some embodiments such as medical imaging of heart, chest and lungs, the balance is accomplished by specifying a low ram-lak slope value in the first group of settings, and in the second group of settings specifying a high edge strength value.

In some embodiments such as medical orthopedic imaging of bones and cervical spines, the balance is accomplished by specifying a high ram-lak slope value in the first group of settings, and in the second group of settings specifying a low edge strength value.

Figure 4:
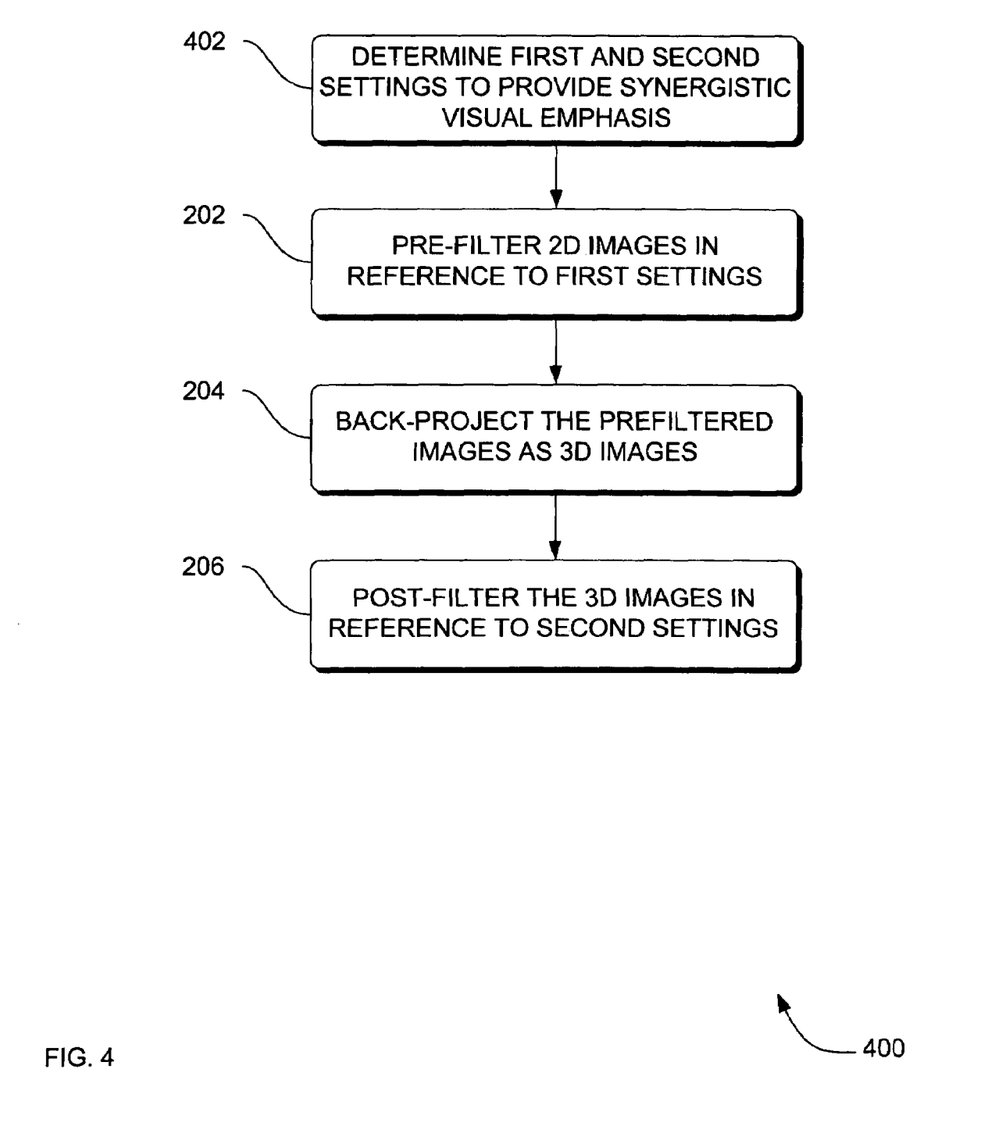
FIG. 4 is a flowchart of a method to construct a 3-D image of an object from a plurality of 2-D projection images of the object according to an embodiment that includes determining filter settings.

FIG. 4 is a flowchart of a method 400 to construct a 3-D image of an object from a plurality of 2-D projection images of the object according to an embodiment that includes determining filter settings.

Method 400 includes determining 402 a first group of pre-filter settings and a second group of post-filter settings to values that are optimized to provide visual emphasis on the one more structures of interest in the object that is synergistic. The synergism produces a balance between an enhanced visual distinction of the one or more structures of interest and an optimal visual representation or depiction of the one or more structures of interest.

Similar to method 200, method 400 also includes pre-filtering 202 the 2-D images in reference to the first group of settings, back-projecting 204 the pre-filtered images as a 3-D image and post-filtering 206 the 3-D image in reference to the second group of settings.

Figure 5:
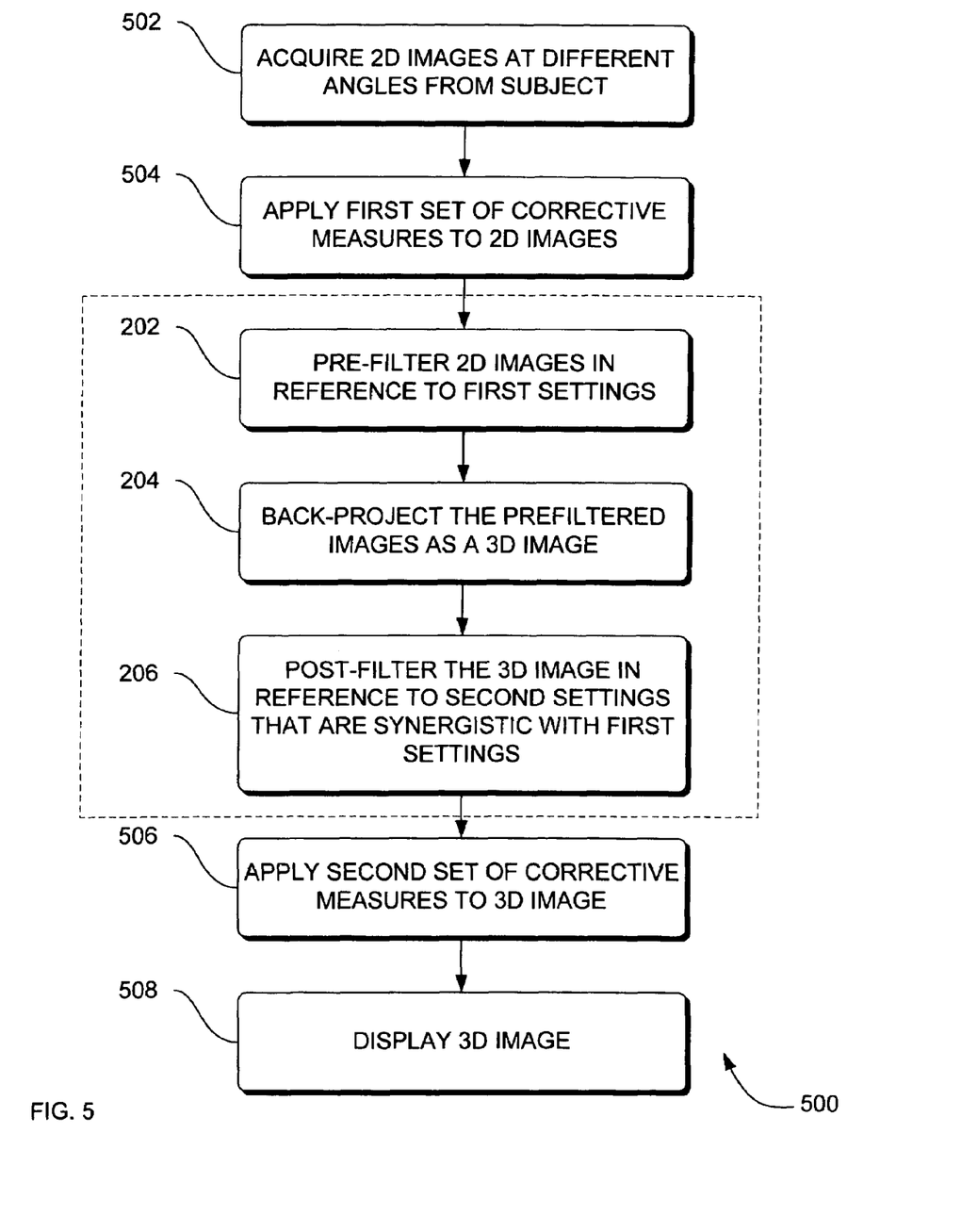
FIG. 5 is a flowchart of a method to construct a 3-D image of an object from a plurality of 2-D projection images of the object according to an embodiment that starts with acquisition of the 2-D images and ends with display of the 3-D image.

FIG. 5 is a flowchart of a method 500 to construct a 3-D image of an object from a plurality of 2-D projection images of the object according to an embodiment that starts with acquisition of the 2-D images and ends with display of the 3-D image.

Method 500 includes acquiring 502 the plurality of 2-D projection images of the object. Each of the 2-D projection images are acquired at different angles relative to the object. The acquisition is performed by a digital image detector, such as an amorphous silicon flat panel, CCD arrays, digitized film screen images, photo-stimulable phosphor screens (computed radiography) or other digital detectors, such as direct conversion detectors (e.g. amorphorus selenium aSe).

Thereafter, method 500 includes applying 504 a first set of corrective measures to the plurality of two-dimensional images. Action 504 is also known as pre-processing. In some embodiments, the first set of corrective measures includes detector corrections of gain, offset, bad pixels, geometry distortions (e.g. R-square), log transformation to restore "film-like" look, noise reduction, bad detector edge, padding, beam hardening, off-focal radiation, reference and/or normalization.

Method 500 also includes pre-filtering 202 the plurality of 2-D projection images as in method 200, back-projecting 204 the filtered 2-D projection images into the three-dimensional image also as in method 200, and post-filtering 206 the 3-D image.

Thereafter, method 500 includes applying 506 a second set of corrective measures to the post-filtered 3-D image.

Subsequently, the corrected 3-D image is displayed. In one embodiment, the corrected 3-D image is displayed on an imaging console that is part of the imaging system.

Figure 6:
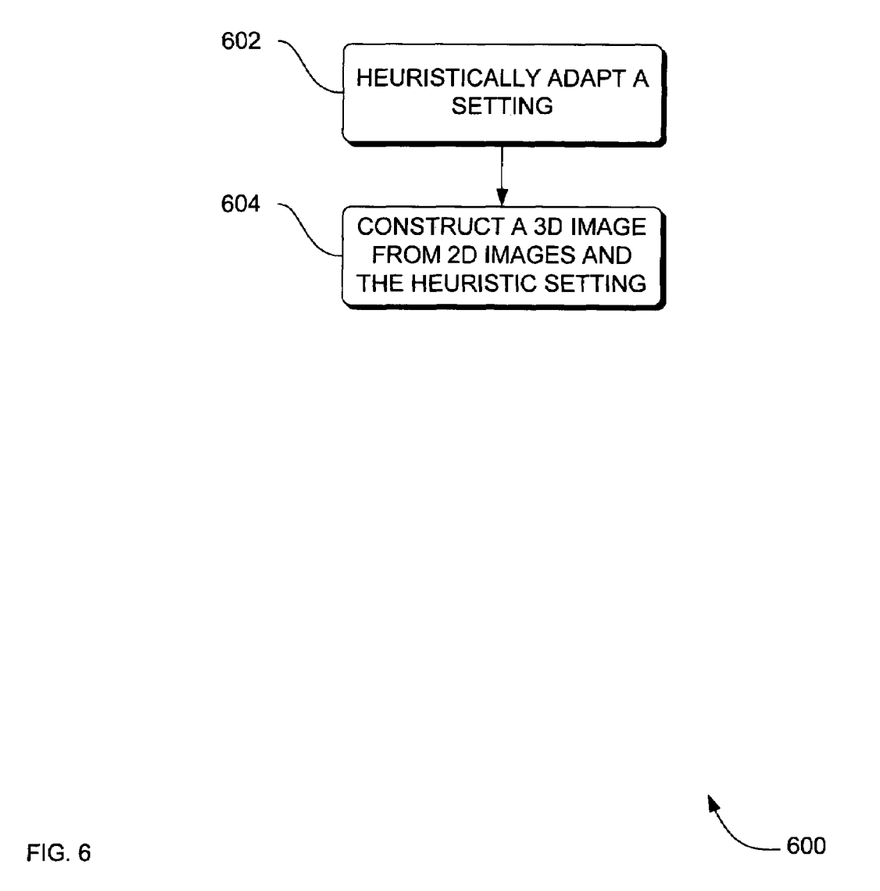
FIG. 6 is a flowchart of a method to generate a 3-D image of an object according to an embodiment using heuristic adaptation.

FIG. 6 is a flowchart of a method 600 to generate a 3-D image of an object according to an embodiment using heuristic adaptation. Method 600 includes heuristically adapting 602 at least one configuration setting.

Method 600 also includes constructing 604 the three-dimensional image of an object from a plurality of two-dimensional projection images of the object in reference to the at least one configuration settings.

In some embodiments of method 600, the heuristic adapting 602 is performed before the constructing 602. In other embodiments of method 600, the heuristic adapting 602 is performed after the constructing 604.

Figure 7:
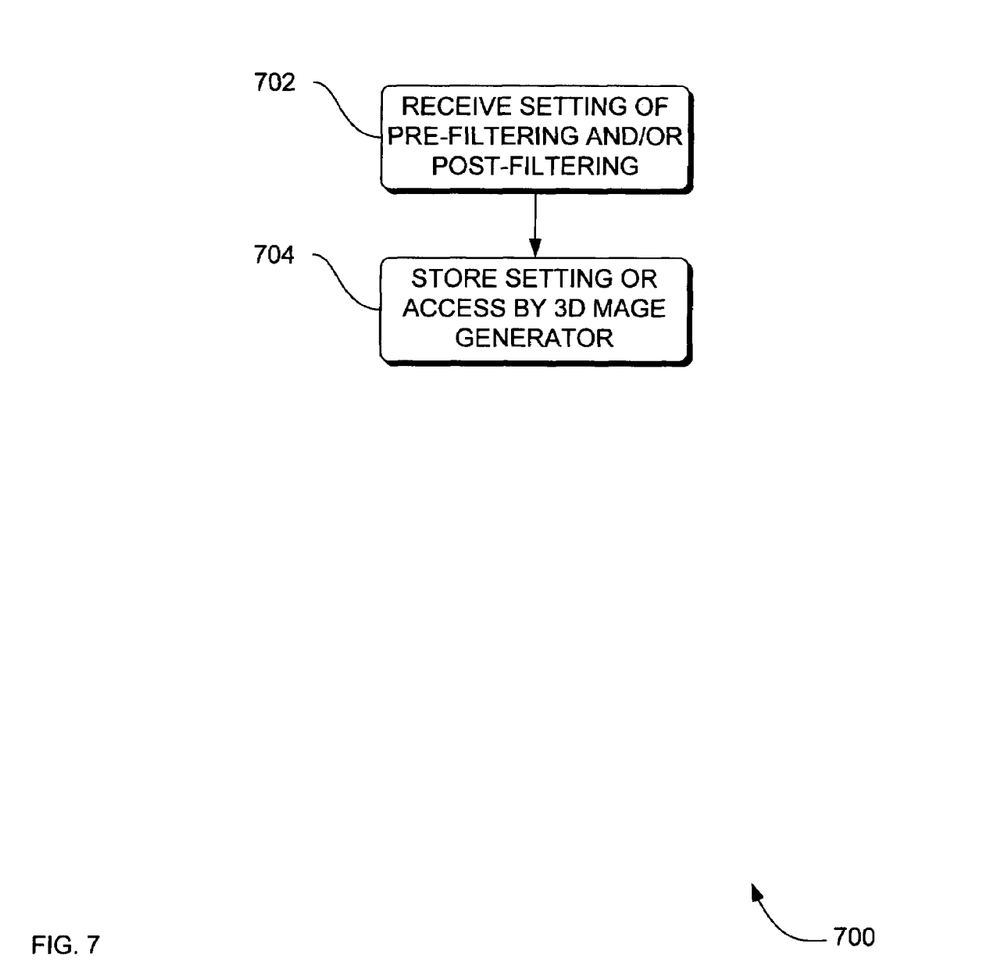
FIG. 7 is a flowchart of a method to configure generation of a three-dimensional image of an object from a plurality of two-dimensional images according to an embodiment.

FIG. 7 is a flowchart of a method 700 to configure generation of a three-dimensional image of an object from a plurality of two-dimensional images according to an embodiment.

Method 700 includes receiving 702 from an operator one or more configuration settings for pre-filtering and/or post-filtering of the images. The receiving 702 is performed by a processor, such as processor 804 in computer 802 in FIG. 8 below. Examples of the configuration settings are the first group of settings 106 and the second group of settings 116 in FIG. 1 above.

Method 700 also includes storing 704 the configuration settings in a location that is readily accessible to a generator of the three-dimensional image. Examples of locations at which the configurations settings are stored are the random-access memory (RAM) 806 and the one or more mass storage devices 810 in computer 802 in FIG. 8 below.

Figure 8:
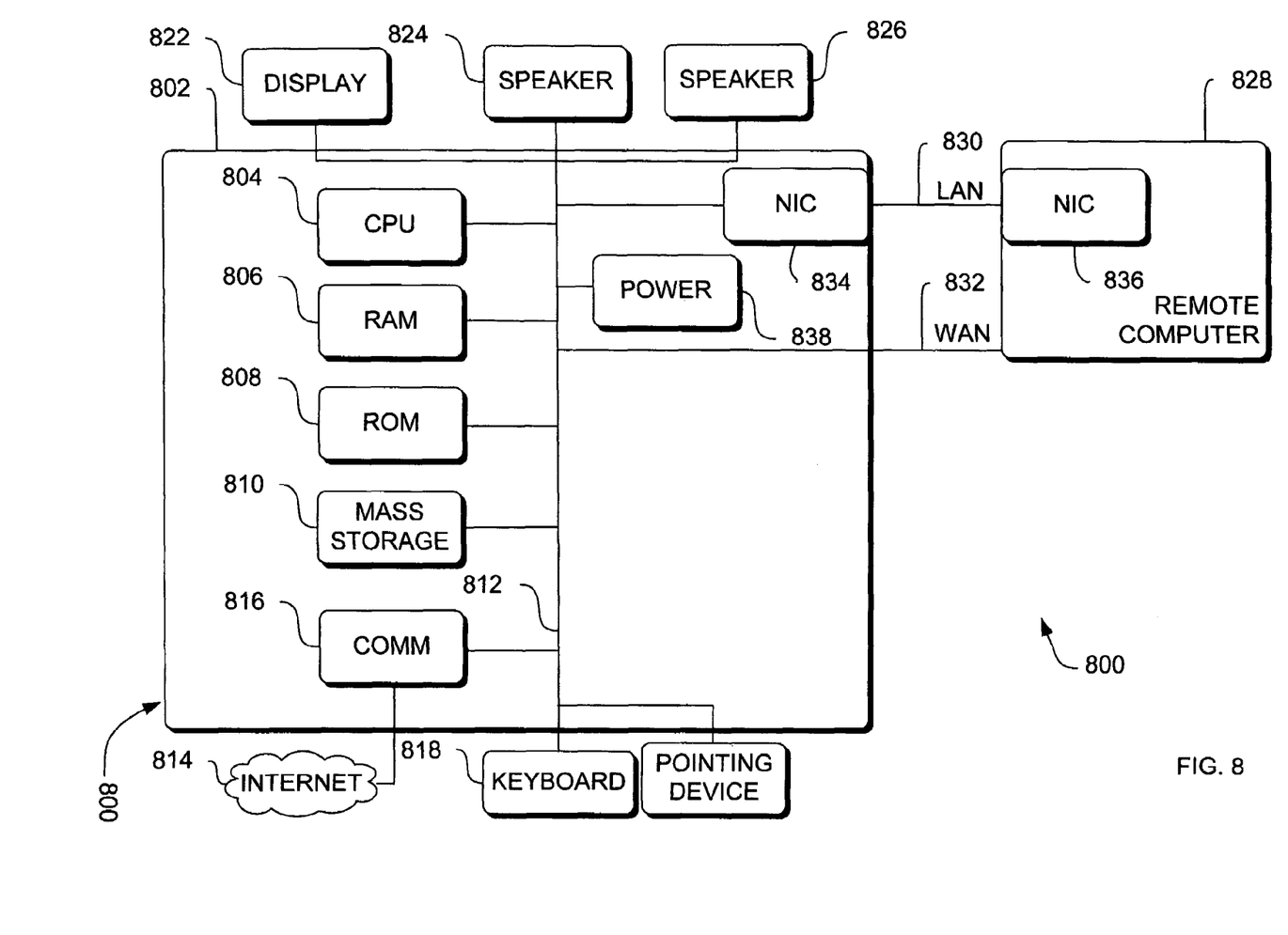
FIG. 8 is a block diagram of a hardware and operating environment in which different embodiments can be practiced.

In some embodiments, methods 200-700 are implemented as a computer data signal embodied in a carrier wave, that represents a sequence of instructions which, when executed by a processor, such as processor 804 in FIG. 8, cause the processor to perform the respective method. In other embodiments, methods 200-700 are implemented as a computer-accessible medium having executable instructions capable of directing a processor, such as processor 804 in FIG. 8, to perform the respective method. In varying embodiments, the medium is a magnetic medium, an electronic medium, or an optical medium.

Hardware and Operating Environment

FIG. 8 is a block diagram of the hardware and operating environment 800 in which different embodiments can be practiced. The description of FIG. 8 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 802 includes a processor 804, commercially available from Intel, Motorola, Cyrix and others. Computer 802 also includes random-access memory (RAM) 806, read-only memory (ROM) 808, and one or more mass storage devices 810, and a system bus 812, that operatively couples various system components to the processing unit 804. The memory 806, 808, and mass storage devices, 810, are types of computer-accessible media. Mass storage devices 810 more specifically are types of nonvolatile computer-accessible media and can include one or more hard disk drives, floppy disk drives, optical disk drives, and tape cartridge drives. The processor 804 executes computer programs stored on the computer-accessible media.

Computer 802 can be communicatively connected to the Internet 814 via a communication device 816. Internet 814 connectivity is well known within the art. In one embodiment, a communication device 816 is a modem that responds to communication drivers to connect to the Internet via what is known in the art as a "dial-up connection." In another embodiment, a communication device 816 is an Ethernet® or similar hardware network card connected to a local-area network (LAN) that itself is connected to the Internet via what is known in the art as a "direct connection" (e.g., T1 line, etc.).

A user enters commands and information into the computer 802 through input devices such as a keyboard 818 or a pointing device 820. The keyboard 818 permits entry of textual information into computer 802, as known within the art, and embodiments are not limited to any particular type of keyboard. Pointing device 820 permits the control of the screen pointer provided by a graphical user interface (GUI) of operating systems such as versions of Microsoft Windows®. Embodiments are not limited to any particular pointing device 820. Such pointing devices include mice, touch pads, trackballs, remote controls and point sticks. Other input devices (not shown) can include a microphone, joystick, game pad, satellite dish, scanner, or the like.

In some embodiments, computer 802 is operatively coupled to a display device 822. Display device 822 is connected to the system bus 812. Display device 822 permits the display of information, including computer, video and other information, for viewing by a user of the computer. Embodiments are not limited to any particular display device 822. Such display devices include cathode ray tube (CRT) displays (monitors), as well as flat panel displays such as liquid crystal displays (LCD's). In addition to a monitor, computers typically include other peripheral input/output devices such as printers (not shown). Speakers 824 and 826 provide audio output of signals. Speakers 824 and 826 are also connected to the system bus 812.

Computer 802 also includes an operating system (not shown) that is stored on the computer-accessible media RAM 806, ROM 808, and mass storage device 810, and is and executed by the processor 804. Examples of operating systems include Microsoft Windows®, Apple MacOS®, Linux®, UNIX®. Examples are not limited to any particular operating system, however, and the construction and use of such operating systems are well known within the art.

Embodiments of computer 802 are not limited to any type of computer 802. In varying embodiments, computer 802 comprises a PC-compatible computer, a MacOS®-compatible computer, a Linux®-compatible computer, or a UNIX®-compatible computer. The construction and operation of such computers are well known within the art.

Computer 802 can be operated using at least one operating system to provide a graphical user interface (GUI) including a user-controllable pointer. Computer 802 can have at least one web browser application program executing within at least one operating system, to permit users of computer 802 to access an intranet, extranet or Internet world-wide-web pages as addressed by Universal Resource Locator (URL) addresses. Examples of browser application programs include Netscape Navigators® and Microsoft Internet Explore®.

The computer 802 can operate in a networked environment using logical connections to one or more remote computers, such as remote computer 828. These logical connections are achieved by a communication device coupled to, or a part of, the computer 802. Embodiments are not limited to a particular type of communications device. The remote computer 828 can be another computer, a server, a router, a network PC, a client, a peer device or other common network node. The logical connections depicted in FIG. 8 include a local-area network (LAN) 830 and a wide-area network (WAN) 832. Such networking environments are commonplace in offices, enterprise-wide computer networks, intranets, extranets and the Internet.

When used in a LAN-networking environment, the computer 802 and remote computer 828 are connected to the local network 830 through network interfaces or adapters 834, which is one type of communications device 816. Remote computer 828 also includes a network device 836. When used in a conventional WAN-networking environment, the computer 802 and remote computer 828 communicate with a WAN 832 through modems (not shown). The modem, which can be internal or external, is connected to the system bus 812. In a networked environment, program modules depicted relative to the computer 802, or portions thereof, can be stored in the remote computer 828.

Computer 802 also includes power supply 838. Each power supply can be a battery.

Computer Implementation

Figure 9:
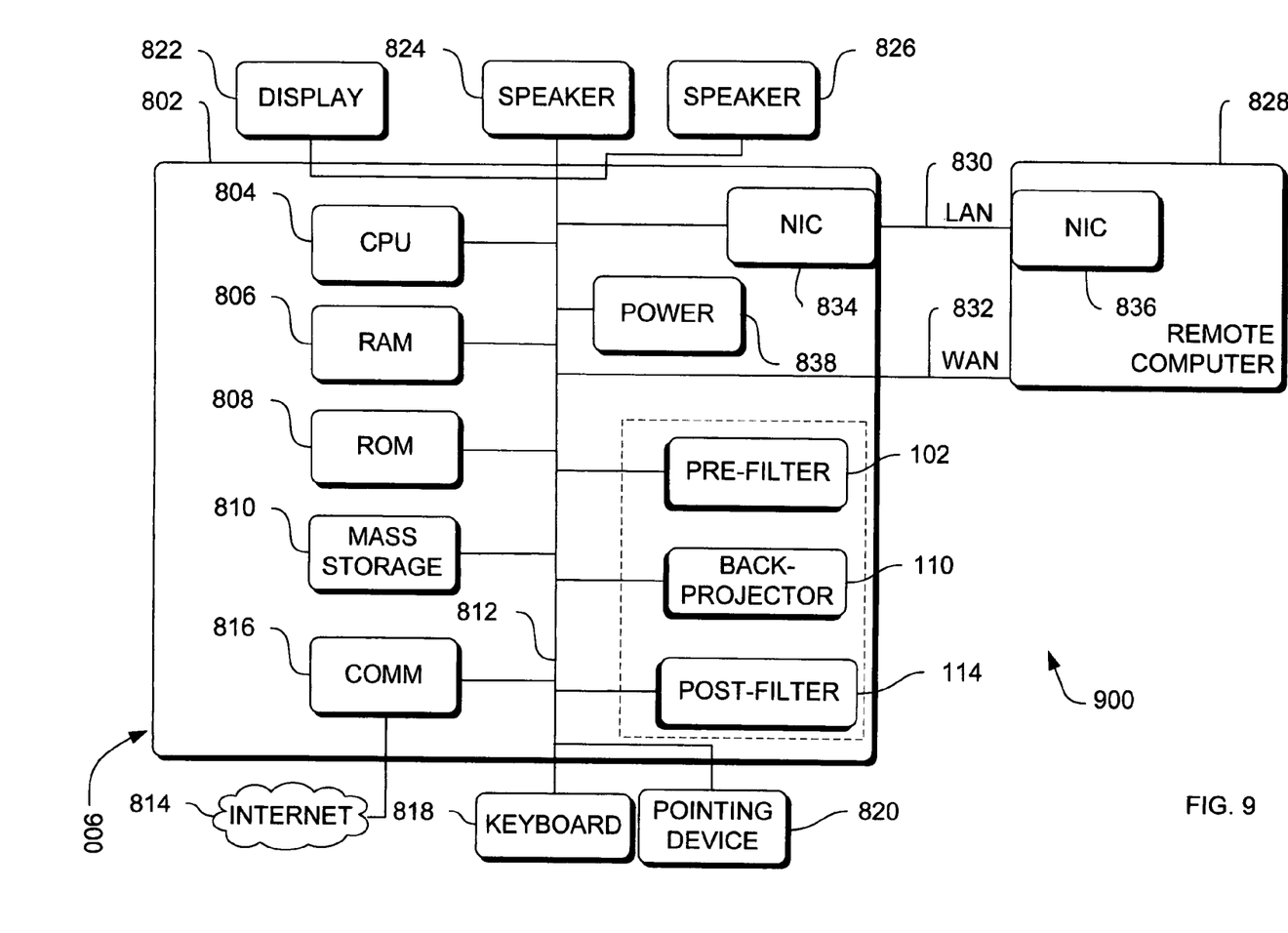
FIG. 9 is a block diagram of an apparatus to construct a 3-D image of an object from a plurality of 2-D projection images of the object according to an embodiment.

Referring to FIG. 9, a particular implementation 900 is described in conjunction with the system overview in FIG. 1 and the methods described in conjunction with FIGS. 200-700.

Apparatus 900 includes the pre-filter 102, the back-projector 110 and the post-filter 114 of system 100 in FIG. 1. Apparatus 900 provides 3-D images that have sharp visual distinctions and that also have the details of the 2-D images from which the 3-D images are generated.

The methods 200-700 and apparatus components of the pre-filter 102, the back-projector 110 and the post-filter 114 can be embodied as computer hardware circuitry or as a computer-readable program, or a combination of both. In another embodiment, system 100 is implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 802 in FIG. 8, or on at least as many computers as there are components.

CONCLUSION

A system for filtered back-projection reconstruction in digital tomosynthesis described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database and communication environments and alternate technologies which provide the same functionality as described herein.

We claim:

1. A computer-accessible medium having executable instructions capable of directing a processor to perform:

applying a first set of corrective measures to a plurality of two-dimensional images;

reconstructing a three-dimensional image of an object from the plurality of two-dimensional projection images, the reconstructing including:

pre-filtering the plurality of two-dimensional projection images in reference to a first group of settings that are not the first set of corrective measures and that are optimized to provide a first extent of emphasis on at least one structure of interest in the object;

back-projecting the filtered two-dimensional projection images into the three-dimensional image; and post-filtering the three-dimensional image in reference to a second group of settings that are optimized to provide a second extent of emphasis on the at least one structure of interest in the object that is synergistic with the first extent of emphasis; and applying a second set of corrective measures to the three-dimensional image, wherein the second set of corrective measures are not the second group of settings.

2. The computer-accessible medium of claim 1, wherein synergistic further comprises:
heuristically producing a balance between a visual enhancement of the at least one structure of interest before back-projecting two-dimensional projection images and a visual enhancement of the at least one structure of interest after back-projecting to form the three-dimensional image.

3. The computer-accessible medium of claim 1, the executable instructions capable of directing the processor to perform post-filtering further comprise executable instructions capable of directing the processor to perform:
post-filtering slices of the three-dimensional image.

4. The computer-accessible medium of claim 1, the medium further comprising executable instructions capable of directing the processor to perform:
heuristically adapting at least one setting selected from the first group of settings and the second group of settings.

5. The computer-accessible medium of claim 4, wherein the heuristic adapting is performed before reconstructing.

6. The computer-accessible medium of claim 1, wherein the first set of corrective measures further comprises:
measures selected from the group consisting of detector corrections of gain, offset, bad pixels, geometry distortions, log transformation, noise reduction, bad detector edge, padding, beam hardening, off-focal radiation, reference and normalization.

7. The computer-accessible medium of claim 1, wherein the executable instructions capable of directing the processor to perform pre-filtering further comprise executable instructions capable of directing the processor to perform:
global filtering.

8. The computer-accessible medium of claim 7, wherein the executable instructions capable of directing the processor to perform global filtering further comprise executable instructions capable of directing the processor to perform:
frequency domain filtering.

9. The computer-accessible medium of claim 1, further comprising executable instructions capable of directing the processor to perform:
receiving from an operator the settings for pre-filtering and post-filtering of the images.

10. The computer-accessible medium of claim 1, wherein applying a second set of corrective measures further comprises:
local filtering.

11. The computer-accessible medium of claim 10, wherein local filtering further comprises:
spatial domain filtering.

12. The computer-accessible medium of claim 1, the executable instructions further capable of directing a processor to perform:
acquiring the plurality of two-dimensional projection images of the object, each of the image being acquired at different angles relative to the object.

13. The computer-accessible medium of claim 1, the plurality of two-dimensional projection images further comprising:
a plurality of two-dimensional X-Ray projection images.

14. The computer-accessible medium of claim 1, the plurality of two-dimensional projection images further comprising:
a plurality of two-dimensional computer tomography projection images.

15. The computer-accessible medium of claim 1, the plurality of two-dimensional projection images further comprising:
a plurality of two-dimensional volumetric computer tomography projection images.

16. A method comprising:
applying a set of corrective measures to a plurality of two-dimensional images;
reconstructing a three-dimensional image of an object from the plurality of two-dimensional projection images, the reconstructing including:
controlling pre-filtration of the plurality of two-dimensional projection images, in reference to configuration settings that are not the set of corrective measures and that are optimized to provide a first extent of emphasis on a plurality of structures of interest in the object;
back-projecting the filtered two-dimensional images into the three-dimensional image; and
controlling post-filtration of the three-dimensional image, in reference to configuration settings that are optimized to provide a second extent of emphasis on the a plurality of structures of interest in the object that is synergistic with the first extent of emphasis wherein the method is performed by a processor.

17. The method of claim 16, further comprising:
heuristically adapting at least one of the configuration settings.

18. A method to generate a three-dimensional image of an object, the method comprising:
applying a set of corrective measures to a plurality of two-dimensional images;
heuristically adapting at least one configuration setting that is not the set of corrective measures; and
reconstructing the three-dimensional image of an object from back-projecting the plurality of two-dimensional projection images of the object and from the at least one configuration setting wherein the method is performed by a processor.

19. The method of claim 18, wherein the configuration settings are heuristically adapted to interact among the configuration settings during reconstructing to produce a balance between a visual enhancement of the at least one structure of interest before back-projecting two-dimensional projection images and a visual enhancement of the at least one structure of interest after back-projecting to form the three-dimensional image.

20. The method of claim 18, wherein the heuristic adapting is performed before the reconstructing.

21. The method of claim 18, wherein the heuristic adapting is performed after the reconstructing.

22. A medical imaging console comprising:
a processor; and
a storage device coupled to the processor operable to store:
a plurality of two-dimensional projection images;
a set of corrective measures of the two-dimensional projection images;
at least one pre-filter setting that is not the set of corrective measures and that is optimized to provide a first extent of emphasis on at least one structure of interest in the object;
at least one post-filter setting that is optimized to provide a second extent of emphasis on at least one structure of interest in the object, wherein the first extent of emphasis is visually synergistic with the second extent of emphasis;

a pre-processor operable on the processor to apply the set of corrective measures to the two-dimensional projection images;

a reconstructor including:

a pre-filter operable on the processor to pre-filter the plurality of two-dimensional projection images using the at least one pre-filter setting;

a back-projector operable on the processor to back-project the pre-filtered two-dimensional projection images in slices into a three-dimensional image; and a post-filter operable on the processor to filter the two-dimensional slices of the three-dimensional image using the at least one post-filter.

23. The medical imaging console of claim 22, wherein the pre-filter, the back-projector and the post-filter further comprise software apparatus.

24. The medical imaging console of claim 22, wherein the visual synergism provides at least an enhanced visual distinction of a structure of interest in the 3-D image but less than an optimal visual distinction of the structure of interest.

* * * * *